United States Patent
Li et al.

(10) Patent No.: US 9,532,284 B2
(45) Date of Patent: Dec. 27, 2016

(54) WIRELESS COMMUNICATION HANDOFFS WITHIN A MACROCELL

(71) Applicant: ALCATEL LUCENT, Paris (FR)

(72) Inventors: Patrick Li, Beijing (CN); Victor Pan, Somerset, NJ (US); David A. Rossetti, Morris, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 53 days.

(21) Appl. No.: 14/551,382

(22) Filed: Nov. 24, 2014

(65) Prior Publication Data

US 2015/0148047 A1 May 28, 2015

Related U.S. Application Data

(63) Continuation of application No. 11/371,707, filed on Mar. 9, 2006, now abandoned.

(51) Int. Cl.
*H04W 36/04* (2009.01)
*H04W 24/02* (2009.01)
*H04W 28/06* (2009.01)

(52) U.S. Cl.
CPC .............. *H04W 36/04* (2013.01); *H04W 24/02* (2013.01); *H04W 28/06* (2013.01)

(58) Field of Classification Search
CPC .............. H04B 7/15507; H04B 7/2606; H04W 36/143; H04W 24/02; H04W 8/26; H04W 24/00; H04W 28/06; H04W 88/12; H04W 60/00; H04W 84/045; H04W 88/08; H04W 36/00; H04W 16/16; H04W 36/04; H04Q 7/20

(Continued)

(56) References Cited

U.S. PATENT DOCUMENTS

| 5,212,822 A | 5/1993 | Fukumine et al. |
| 5,987,013 A | 11/1999 | Kabasawa |

(Continued)

FOREIGN PATENT DOCUMENTS

| KR | 20010054094 A | 7/2001 |
| KR | 20020023477 A | 3/2002 |

(Continued)

OTHER PUBLICATIONS

International Search Report and Written Opinion of the International Searching Authority for International application No. PCT/US2007/005102 dated Aug. 3, 2007.

(Continued)

*Primary Examiner* — Khawar Iqbal
(74) *Attorney, Agent, or Firm* — Carlson, Gaskey & Olds, P.C.

(57) ABSTRACT

Handoffs within a wireless communication system (20) include using a common cell definition code for each of a plurality of microcell BTSs (30, 40, 50) to facilitate handoffs between a macrocell (26) and any one of the microcells. In a disclosed example, a common cell definition code such as a PN offset or a scrambling code is used to trigger a handoff from the macrocell (26) to any one of the microcell BTSs (30, 40, 50). A mobile station locate feature identifies which of the BTSs is involved in the handoff. Another common cell definition code is used in one example to trigger all handoffs from any one of the microcells (30, 40, 50) to the macrocell (26). Soft handoff and hard handoff examples are disclosed.

18 Claims, 2 Drawing Sheets

(58) Field of Classification Search
USPC .................................... 455/436, 442, 444
See application file for complete search history.

(56) References Cited

U.S. PATENT DOCUMENTS

| | | | |
|---|---|---|---|
| 6,438,379 B1 | 8/2002 | Gitlin et al. | |
| 6,567,482 B1 | 5/2003 | Popovic | |
| 6,950,678 B1 | 9/2005 | Mujtaba et al. | |
| 7,139,580 B2 | 11/2006 | Stein et al. | |
| 7,171,216 B1* | 1/2007 | Choksi | H04L 29/06 455/403 |
| 8,014,776 B2* | 9/2011 | Nylander | H04W 16/32 455/426.1 |
| 9,148,866 B2* | 9/2015 | Gogic | G01S 5/0252 |
| 2004/0219930 A1* | 11/2004 | Lin | H04W 64/00 455/456.1 |
| 2006/0094431 A1* | 5/2006 | Saifullah | H04W 36/14 455/436 |
| 2006/0121907 A1* | 6/2006 | Mori | H04W 16/10 455/447 |
| 2006/0223536 A1* | 10/2006 | Chia | H04W 36/14 455/436 |
| 2007/0064648 A1* | 3/2007 | Kim | H04B 7/2628 370/331 |
| 2007/0213067 A1 | 9/2007 | Li et al. | |
| 2007/0281696 A1* | 12/2007 | Vikberg | H04L 12/2854 455/436 |
| 2007/0293222 A1* | 12/2007 | Vikberg | H04W 16/32 455/436 |
| 2008/0219212 A1* | 9/2008 | Kim | H04W 36/0066 370/331 |
| 2009/0247120 A1* | 10/2009 | Heutschi | H04L 63/0853 455/406 |
| 2009/0275332 A1* | 11/2009 | Niska | H04W 36/0077 455/436 |
| 2010/0227628 A1* | 9/2010 | Anderson | G01S 5/0205 455/456.3 |

FOREIGN PATENT DOCUMENTS

| | | |
|---|---|---|
| KR | 20020096326 A | 12/2002 |
| WO | 9202104 | 2/1992 |
| WO | 0111804 A1 | 2/2001 |
| WO | 2005076648 A1 | 8/2005 |

OTHER PUBLICATIONS

Extended European Search Report for Application No. EP 11 00 1401 dated Jun. 21, 2011.

* cited by examiner

WIRELESS COMMUNICATION HANDOFFS WITHIN A MACROCELL

CROSS REFERENCE TO RELATED APPLICATION

This application is a continuation of U.S. patent application Ser. No. 11/371,707, which was filed on Mar. 9, 2006.

FIELD OF THE INVENTION

This invention generally relates to communication. More particularly, this invention relates to wireless communications.

DESCRIPTION OF THE RELATED ART

Wireless communication systems are well known and in widespread use. Many systems are arranged to provide wireless service or coverage within geographically or otherwise distinct areas. Most systems include a plurality of base station transceivers (BTS) that are situated to provide coverage over particular areas. The area of coverage for each BTS is commonly referred to as a cell. As known, many cells are divided into several sectors to increase wireless coverage within the cell.

In some situations, a cell can be considered a macrocell because there are other BTS units within the macrocell region that are intended to serve a particular portion of the macrocell. These smaller areas within a macrocell can be referred to as microcells. One example use of a BTS to establish a microcell is to include a BTS within a building to provide wireless service coverage within that building. One reason for doing so is that outside BTS equipment may not be able to provide adequate radio frequency (RF) coverage to provide reliable wireless service throughout the interior of a building. Another reason for including in-building BTS equipment is to relieve the macrocell BTS from having to handle traffic from users within such a building, which can increase capacity of the overall system.

It is common for mobile stations to communicate with at least one BTS when the mobile station is within the coverage area of the corresponding cell or sector. As a mobile station moves, it is often necessary to handoff between cells or sectors. One technique for doing so is known as a hard handoff where a mobile station stops communicating with one BTS before communicating with a next BTS. Another technique is known as a soft handoff where a mobile station communicates with multiple BTSs at one time during a handoff procedure.

Including BTS equipment to establish microcells such as within buildings introduces challenges and complexities associated with managing handoffs between the macrocell and the microcell BTSs, for example. Such handoffs are highly desirable from a quality of service perspective. As a mobile subscriber enters a building, for example, a handoff between the macrocell BTS and the in-building BTS ensures that the mobile subscriber has continuous coverage inside and outside of the building. In many situations, handoffs may occur between the macrocell and the in-building microcell if a mobile subscriber is near a window, for example, where the RF signaling of the macrocell may be favorable for communications for that mobile station.

The problems associated with handoffs between a macrocell and microcells within the macrocell include pilot pollution, neighbor list resource exhaustion, pseudo random noise offset (PN offset) assignment, scrambling code assignment and traffic capacity loss.

Pilot pollution arises from the RF of the outside macrocell undesirably leaking inside a building or otherwise within an area considered a microcell served by a separate BTS. The outside macrocell RF in this regard essentially pollutes the inside as the RF leakage interferes with the inside RF. In some cases, when the macrocell BTS and the microcell BTS are not on each other's neighbor list, a dropped call will typically result as the mobile station moves from the RF coverage of one cell to the other.

For such situations, the microcell or in-building system must be designed to "overpower" the outside macrocell system to provide inside RF coverage throughout the microcell (e.g., throughout the interior of a building), thereby making handoff unnecessary. At the same time, making an in-building or microcell system too powerful results in RF from the inside system leaking outside of the microcell. This can cause problems with macrocell performance, also.

Neighbor list resource exhaustion can occur in situations where there are a plurality of in-building microcells within a single macrocell. The BTSs for each microcell or in-building system are typically placed on the neighbor list of the macrocell. Having the BTSs on the neighbor list facilitates the desirable handoff through building portals and provides call continuity over entire floor areas in the upper levels of a building, for example. Because every in-building BTS must be on the macrocell's neighbor list, problems arise where there are more than a few such BTSs. Typical neighbor list resources place a hard limit on the number of microcell BTSs that can be supported. Typical neighbor list resource limits provide for approximately 20 BTS listings on the neighbor list. Many of these are needed to support outside communications. Adding a plurality of in-building BTSs to a neighbor list becomes problematic.

One proposed solution is to increase the resources used for the neighbor list (e.g., provide for a larger neighbor list size). While this alleviates a hard limit on the number of in-building systems that can be covered, there still are situations in urban areas where many buildings should be covered. A drawback to increasing the neighbor list size is that it slows down a mobile station's measurement time of handoff candidates and degrades handoff performance with macrocells, in general. Another drawback to increasing the neighbor list size is that it increases paging channel occupancy. Therefore, simply increasing the size of a neighbor list is not an adequate solution because there are limits on a manageable size and performance problems are introduced as the size of the list increases.

Another problem that arises has to do with PN offset or scrambling code assignments. A known approach for hard handoffs between a macrocell and in-building microcells includes using a set of pilot beacons, one for every outside carrier that is not used inside, for entering the building. Another set of pilot beacons, one for every inside carrier not used outside, is used for leaving the building. These pilot beacons transmit PN offsets or scrambling codes on frequencies visible for mobile stations operating on frequencies prior to handoff. Because mobile stations typically tune to only one frequency at a time, the pilot beacons are operating on the serving frequency before a hard handoff. The PN offsets or scramblings codes trigger the hard handoff to the new frequency.

As more in-building BTSs are deployed, PN offset or scrambling code planning becomes much more complicated. New PN offsets or scrambling code assignments are needed for each in-building BTS and sector. These PN offsets or scrambling code assignments need to be coordinated with the macrocell for entering and leaving the building on each possible carrier. The limits on available PN offset or scrambling code assignment also place a hard limit on the number of buildings or other microcells that can be covered by dedicated BTS equipment. The resources for PN offset or scrambling code assignment are fixed by applicable standards. As the plurality of in-building BTS increases, finding the assignments becomes increasingly problematic.

Traffic capacity loss can arise when there are in-building BTSs within a macrocell. When there are many such buildings within a macrocell coverage area, the macrocell may be in greatly increased soft handoff with the various floors of all of the buildings within the macrocell coverage area. This can result in a significant loss in traffic capacity as channel elements become tied up in relatively excessive soft handoff. One compelling financial incentive to deploy a dedicated BTS within a building is to provide traffic capacity exhaust relief for the serving macrocell. If there is excessive soft handoff between the macrocell and such in building BTSs, the incentive for adding the dedicated BTS equipment is diminished.

In the case of hard handoffs, the problems with exhausting neighbor list resources and PN offset or scrambling code assignment still exist. Arguably, there is no BTS traffic capacity loss nor pilot pollution when hard handoffs are employed between a macrocell and in-building cells within the macrocell coverage area. Conventional wisdom favors soft handoffs as they are considered generally more reliable than hard handoffs. Some believe that all hard handoffs are unreliable. In the case of a handoff between a macrocell and an in-building microcell, the scenario allows for more reliable hard handoffs. Walking speeds of individual subscribers combined with wall or ceiling mounted antennas that radiate over much smaller areas make macrocell handoff experience (i.e., handoffs between macrocells) not applicable. Some believe that appropriate RF coverage design can facilitate reliable hard handoffs between a macrocell and an in-building cell.

It is desirable to be able to include any number of microcells such as in-building microcells within a macrocell coverage area to meet the needs of a particular situation. This invention addresses that need and avoids the shortcomings associated with pilot pollution, traffic capacity loss, neighbor list resource exhaustion and PN offset or scrambling code assignment described above.

SUMMARY OF THE INVENTION

This invention includes a unique strategy using a common cell definition code for triggering handoffs between a macrocell and any of a plurality of microcells within the macrocell coverage area.

An exemplary method of communicating includes using a common cell definition code for a plurality of microcells within a single macrocell to facilitate handoff between the macrocell and at least one of the microcells.

One example includes using the common cell definition code to facilitate a handoff from the macrocell to at least one of the microcells. This is useful, for example, when a mobile subscriber is entering a building that has a dedicated BTS to provide in-building coverage. A second common cell definition code facilitates a handoff from any of the microcells to the macrocell. This is useful as a mobile subscriber exits a building.

An example implementation includes a PN offset or a scrambling code as the common cell definition code.

One advantage to such an arrangement is that it greatly reduces the number of cell definition codes required for a neighbor list. In one example, a macrocell maintains only one such code on the neighbor list to facilitate handoffs between it and any one of the plurality of microcells having that code.

One example includes a mobile station locating technique to facilitate handoff between the macrocell and a corresponding microcell. In one example, whenever a mobile station currently communicating with the macrocell detects the common cell definition code, a power measurement from the mobile station is taken at each of the plurality of microcells. The microcell that receives the power measurement from the mobile station is identified as the one to which handoff should be completed. This example technique is useful where soft handoffs are used and the same frequencies are used in the microcell and the macrocell.

Another example includes hard handoffs between the macrocell and the microcells. In this example, a long code mask is used for locating a reverse pilot signal from the mobile station on a frequency used by the macrocell and the mobile station. The microcell to which handoff should be completed is identified based upon the located reverse pilot signal.

The various features and advantages of this invention will become apparent to those skilled in the art from the following detailed description. The drawings that accompany the detailed description can be briefly described as follows.

DETAILED DESCRIPTION

This invention includes a unique strategy for triggering handoff between a macrocell and any one of a plurality of microcells such as in-building cells within the macrocell coverage area. A disclosed example includes using a common cell definition code for each of a plurality of microcells within a microcell coverage area. One common cell definition code is used for triggering handoffs from the macrocell to a microcell. Another common cell definition code is used for triggering all handoffs from a microcell to the macrocell. Techniques for locating the mobile station provide sufficient identity of the microcell involved in a handoff as a mobile station enters the microcell coverage area.

Figure 1:
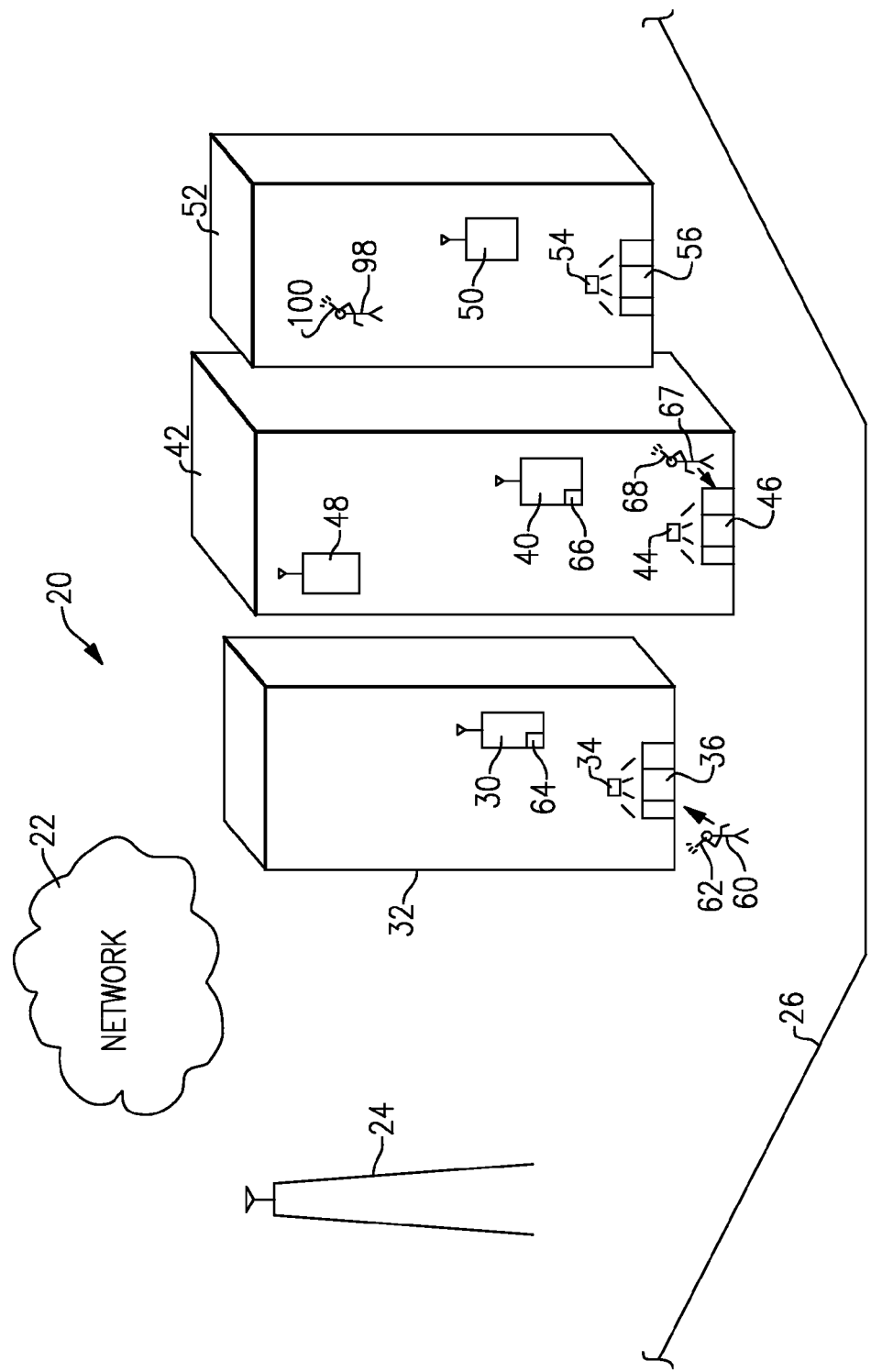
FIG. 1 schematically illustrates selected portions of a wireless communication system that is useful with an embodiment of this invention.

FIG. 1 schematically shows selected portions of a wireless communication system 20. A wireless network 22 includes known elements and operates in a known fashion to facilitate wireless communications. In the illustration, a base station transceiver (BTS) 24 and an associated radio tower provides coverage for a macrocell schematically shown at 26.

The illustrated example is an urban area where there are a plurality of relatively large buildings within the macrocell 26. At least some of those buildings have a dedicated BTS to provide radio frequency (RF) coverage within the building. Each such building is considered a microcell within the macrocell 26 for discussion purposes. One example microcell BTS 30 is included within a building 32 to provide RF coverage within that building. At least one beacon 34 is strategically positioned relative to a portal 36 that provides egress between the interior of the building (e.g., a lobby) and the outside.

Another example BTS 40 is included within a building 42. A beacon 44 is strategically positioned relative to a portal 46. The example building 42 is relatively larger than the building 32 and includes a separate BTS 48 to provide coverage within the upper levels of the building, for example, while the BTS 40 provides adequate coverage in the lower levels of the building, for example. In the case of the microcell of the building 42, handoffs will occur between the macrocell 26 and the BTS 40, for example, and handoffs may occur between the BTSs 40 and 48 as the mobile subscriber moves within the building 42.

The illustration includes another BTS 50 associated with a building 52. At least one beacon 54 is strategically positioned relative to the portal 56 to provide wireless signaling in that area in a manner to be described.

One feature of the illustrated example is that a common cell definition code is used for triggering a handoff between the macrocell 26 and any one of the microcells associated with the buildings 32, 42 and 52, respectively. Using a common cell definition code in this example provides the same cell definition code for each in-building microcell within the macrocell 26. In one example, the cell definition code is a pseudo random noise offset (PN offset). PN offsets are known in CDMA systems. Another example includes using a scrambling code as the cell definition code. Scrambling codes are known in UMTS systems, for example.

One example includes using a common cell definition code to trigger a handoff as a mobile station enters a building or microcell within the macrocell 26. Another common cell definition code is used to trigger a handoff as a mobile station exits a building or microcell. In such an example, only one macrocell neighbor list entry is required to cover all in-building or microcell BTSs for facilitating handoffs between the macrocell and any one of the in-building BTSs. Additionally, only two cell definition code (e.g., a PN offset or a scrambling code) assignments are needed. This example represents a significant simplification for managing handoffs between a macrocell and any one of a plurality of microcells within the macrocell coverage area.

With handoffs entering the building, an additional mobile station locate function is included for identifying the in-building BTS to which the mobile station should be handed off. The common cell definition code provides an indication to initiate a handoff but, because it is shared among several microcells, it cannot specifically identify the microcell to which handoff is needed. Once the appropriate building, microcell or BTS is identified, the handoff can be completed.

As an example, consider a mobile subscriber 60 entering the building 32. The mobile subscriber 60 is using a mobile station 62, which is communicating with the macrocell BTS 24 while the subscriber 60 is outside the building 32. As the mobile subscriber 60 enters the building 32, it is desirable to handoff from the BTS 24 to the BTS 30.

Figure 2:
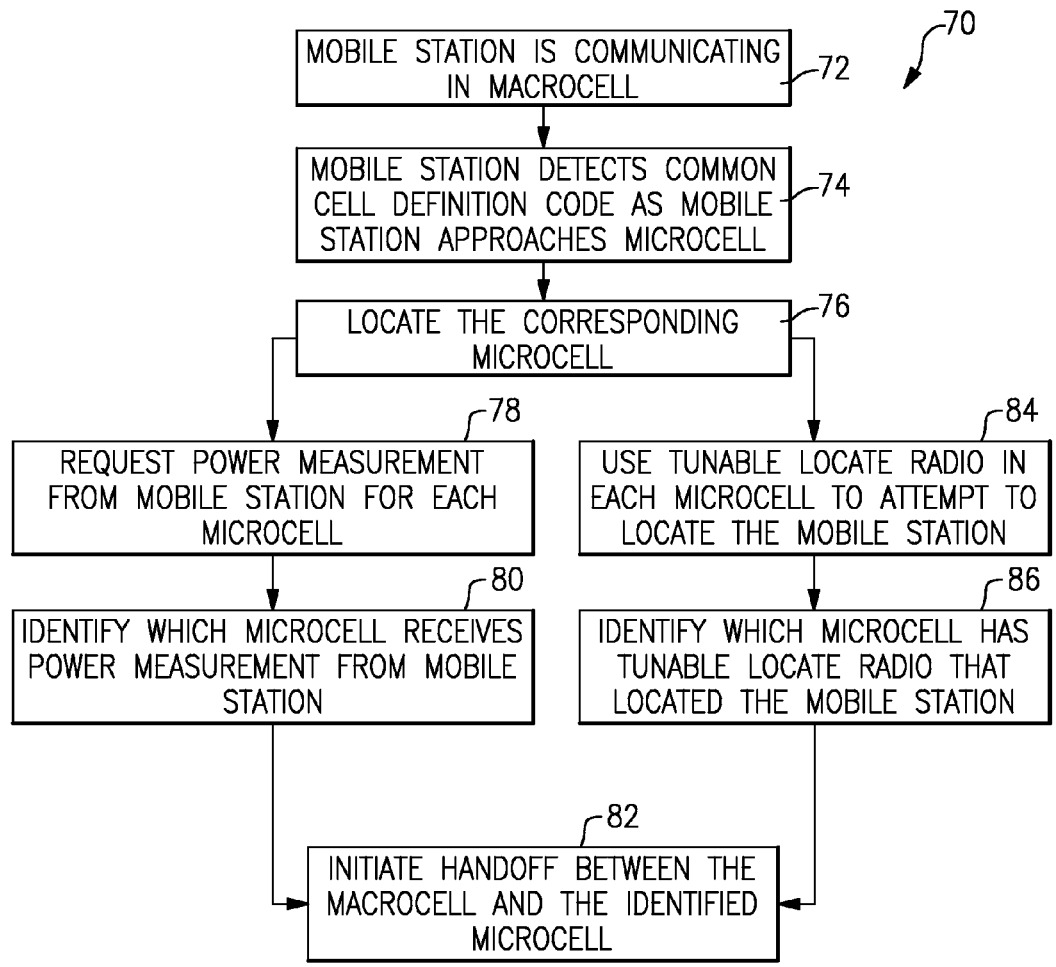
FIG. 2 is a flowchart diagram summarizing one example approach.

FIG. 2 includes a flowchart diagram 70 summarizing one example approach for facilitating such a handoff. At 72, the mobile station 62 is communicating in the macrocell 26. The beacon 34 transmits a signal that provides the common cell definition code for each of the in-building BTSs 30, 40, 50 for example. As the mobile station 62 approaches the portal 36 and enters the building 32, the mobile station detects the common cell definition code transmitted by the beacon 34. In one example CDMA system, the cell definition code comprises a PN offset. In one example UMTS system, the cell definition code comprises a scrambling code.

In FIG. 2, the mobile station detects the common cell definition code at 74. This is reported to the macrocell BTS 24 on the frequency currently used by the mobile station 62. The BTS 24 or another portion of the network 22 such as the corresponding mobile switching center (MSC) uses the detection of the common cell definition code as an initiation of a handoff. To complete the handoff, the MSC will need to identify which of the buildings the mobile station 62 is entering. The common cell definition code does not identify which of the microcells should be involved in the handoff. The process for locating the corresponding microcell is schematically shown at 76 in FIG. 2.

Two possibilities exist for completing such a handoff. In the case of a soft handoff, the mobile station 62 is communicating on a frequency with the BTS 24 prior to handoff. The same frequency will be supported within the microcell so that soft handoff is possible. In such a case, the example of FIG. 2 includes proceeding to the step at 78 where each microcell BTS 30, 40, 50 requests a power measurement from the mobile station. A MSC can command each BTS associated with each microcell to request such a power measurement from the mobile station 62. In reality, only the microcell of the building into which the mobile station 62 is moving or has moved will receive the power measurement from the mobile station 62. That microcell is identified at 80 as the microcell to which handoff should be made. The process in FIG. 2 continues at 82 by initiating the handoff between the macrocell and the identified microcell.

In one example, initiating the handoff does not occur until a mobile station detects the cell definition code (e.g., PN offset) from the in-building BTS 30 or the beacon 34. One example includes requiring that the mobile station concurrently detect a pilot signal strength above a selected threshold. The mobile station reports the detected pilot signal strength to the macrocell BTS 24, which reports that to the MSC as appropriate. Once that occurs, the system knows that the mobile station is transitioning from outside to an inside of a building.

In situations where hard handoffs are used, the example of FIG. 2 includes a locate function step at 84. In this example, a tunable locate radio is included within each microcell. The BTS 30, for example, includes a tunable locate radio 64 while the BTS 40 includes a tunable locate radio 66. In one example, the tunable locate radio is realized by adding additional software to the radio components of the BTS. Those skilled in the art who have the benefit of this invention will realize how to arrange a locate radio to meet their particular needs.

Because a hard handoff is being used, the frequency on which the mobile station is communicating with the macrocell BTS 24 is not being used by the corresponding in-building BTS. The locate radio tunes to the macrocell uplink frequency and looks for the reverse pilot from the mobile station. Tuning to the macrocell uplink carrier and looking for the reverse pilot is possible in the case of 3G mobile stations. In the case of CDMA mobile stations, a specified long code mask is used for this process. For 2G mobile stations, the locate radio uses a multi-path detection option to search for the long code mask.

Once the locate radio detects the reverse pilot, it has located the mobile station. The corresponding BTS is identified as the microcell involved in the handoff at 86. Once the appropriate microcell is identified, handoff is initiated at 82.

Now consider the mobile subscriber 67 using a mobile station 68 within the building 42. As the mobile subscriber 67 approaches the outside of the building 42, handoff will be necessary between the BTS 40, for example, and the BTS 24. In this example, a dedicated, common cell definition code such as a PN offset or a scrambling code is used for all situations when a mobile station is leaving one of the buildings 32, 42 or 52. In this example, the beacon 44 "illuminates" the area (e.g., a lobby) near the portal 46 by transmitting the common cell definition code.

Figure 3:
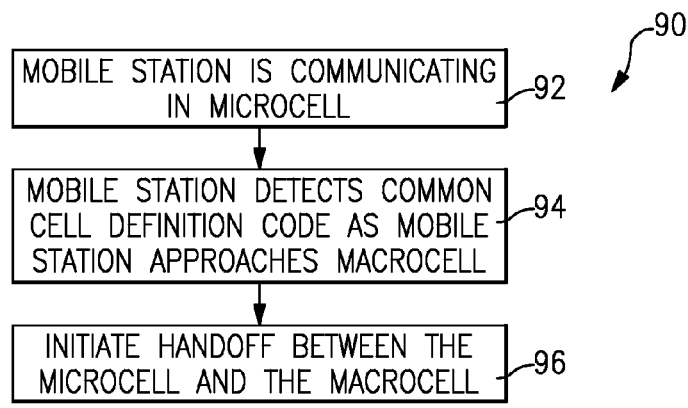
FIG. 3 is a flowchart diagram summarizing another example approach.

As the mobile subscriber 67 approaches the portal 46, the mobile station 68 detects the common cell definition code dedicated to triggering handoffs from a microcell to the macrocell 26. FIG. 3 includes a flowchart diagram 90 that summarizes this scenario. The mobile station is communicating in the microcell of the building 42 at 92. At 94, the mobile station detects the common cell definition code as the mobile station 68 approaches the outside of the building 42.

In a hard handoff case, the mobile station detects the common cell definition code used to trigger a handoff from a microcell to the macrocell 26 on the inside frequency and reports a power measurement back to the MSC through the BTS 40. The MSC already knows the identity of the BTS 40 and, because the corresponding microcell is in a known position relative to the macrocell 26, the MSC already knows which sector within the macrocell 26 to which handoff should be completed. An RF measurement report from the mobile station 68 triggers the MSC to instruct the mobile station 68 to switch to one of the available macrocell frequencies using standard BTS and mobile hard handoff mechanisms. This occurs at 96 in FIG. 3.

In this example, only one cell definition code such as a PN offset assignment is needed to exit a building and the same cell definition code can be used for leaving all buildings to which that assignment is made. One advantage to this example is that no additional PN offset planning or scrambling code assignments are needed and all in-building BTSs can be configured with a single, identical cell definition code for triggering a handoff from any one of the microcells to the macrocell.

A soft handoff example occurs in a similar fashion. The mobile station 68 detects the cell definition code as the mobile subscriber 67 approaches the portal 46. The MSC of the network 22 receives the RF power measurement associated with the cell definition code. The MSC already knows that the mobile station is in an area where the mobile station 68 is about to leave the building 42 because the MSC knows, for example, the location of the BTS 40. The MSC in one example maps the cell definition code (e.g., PN offset) on the in-building BTS 40 to those of the macrocell BTS 24 to initiate the soft handoff.

In soft handoff cases, it is desirable to limit soft handoffs from the in-building BTS to the macrocell to only scenarios when the mobile station is actually about to leave or leaving the building. Avoiding soft handoffs while an individual 98 is using a mobile station 100 in upper levels of the building 52, for example, is desirable. The in-building BTS should carry as much of the inside traffic as possible to maximize macrocell traffic capacity. Soft handoffs involving a mobile station on an upper level of a building diminishes the macrocell traffic capacity.

One example includes preventing such soft handoffs when the same frequency is used inside and outside by not placing the macrocell on the in-building BTS neighbor list. If the macrocell is not on the in-building BTS neighbor list, a handoff from the microcell to the macrocell will not occur under most circumstances. In a building lobby or other access point, however, soft handoff to the outside macrocell from the inside system is desirable. The dedicated cell definition code for triggering a handoff from all inside systems to the macrocell can be selectively transmitted on the inside carrier frequency only in areas near a building access point (e.g., in a lobby). A mobile station within the appropriate distance of one of the beacons 34, 44 or 54, for example, will detect the appropriate cell definition code to trigger a handoff to the macrocell 26. When the MSC receives the RF power measurement associated with such a detected cell definition code, a determination is made that the mobile station is near an access point and not in an upper building level, for example. The MSC responds by mapping PN offsets, for example, on the in-building BTS to those of the macrocell to initiate the soft handoff.

This example approach provides the significant advantage of facilitating a soft handoff only when desired and maximizing the capacity of the macrocell, which is a desired result associated with introducing the in-building BTS.

One example includes not placing the cell definition code used for triggering a handoff as the mobile station enters a building on the macrocell neighbor list so that no soft handoffs from the outside system to the inside system are possible other than near access points or portals of a corresponding building. In such an example, no macrocell neighbor list entries are used for facilitating handoffs from the macrocell to one of the in-building microcells.

Although the illustrated example includes a single cell definition code for all of the plurality of buildings shown, there will be situations where some macrocells include a large enough number of buildings so that buildings may be grouped into distinct pluralities. For such situations, there may be a first plurality of buildings having a first common cell definition code for triggering handoffs between the macrocell and corresponding BTSs within those buildings. A second plurality of buildings may have a second, different common cell definition code for triggering handoffs between the macrocell and corresponding BTSs. In other words, some example implementations of this invention use a common cell definition code for a plurality of buildings within a macrocell but not necessarily all buildings within the macrocell. Even in such situations, the advantages of reduced neighbor list size, enhanced traffic capacity, reduced pilot pollution and simplified PN offset or scrambling code assignment can all be realized.

The disclosed example provides a scalable solution for supporting seamless handoffs to large numbers of in-building BTSs deployed within the coverage area of a single macrocell sector. The disclosed example also greatly simplifies planning PN offsets or scrambling codes when adding in-building BTSs into an existing network. Installation is also simplified because fewer pilot beacons are needed for hard handoff scenarios.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:
1. A method of communicating, comprising:
using a common cell definition code for a plurality of microcells within a single macrocell to facilitate a handoff between the macrocell and at least one of the microcells, wherein each of the microcells corresponds to a building;

determining if a mobile station currently communicating with a base station serving the macrocell detects the common cell definition code;

commanding respective base stations of the plurality of microcells to request a power measurement from the mobile station after determining that the mobile station detected the common cell definition code;

taking the requested power measurement from the mobile station at each of the plurality of microcells;

receiving the power measurement from the mobile station at only one of the microcells;

identifying the only one of the microcells that received the power measurement as the microcell to which the mobile station should be handed off;

using a first common cell definition code as an indicator that a mobile station is entering a building; and using a second common cell definition code as an indicator that a mobile station is exiting a building.

2. The method of claim 1, comprising
initiating a handoff from the macrocell to the only one of the microcells.

3. The method of claim 2, comprising
using a second common cell definition code to facilitate a handoff from at least one of the microcells to the macrocell.

4. The method of claim 1, wherein the microcell definition code comprises at least one of a pseudo random noise offset or a scrambling code.

5. The method of claim 1, comprising at least one of
maintaining a neighbor list having only one identifier of the macrocell at each of a plurality of base stations serving the plurality of microcells, respectively; or
maintaining a neighbor list at a base station serving the macrocell having the common cell definition code for each of the plurality of microcells within the macrocell as the only entry identifying the entire plurality of microcells.

6. The method of claim 1, comprising
determining whether the mobile station detects a corresponding pilot signal strength that exceeds a selected threshold before taking the power measurement.

7. The method of claim 1, wherein the macrocell and the identified microcell use the same frequency for communicating with the mobile station.

8. The method of claim 1, wherein
the plurality of microcells is a first plurality;
there is at least one second plurality of microcells within the macrocell having a second, different common cell definition code;
and comprising
taking the power measurement at only the plurality of microcells corresponding to the common cell definition code detected by the mobile station.

9. The method of claim 1, comprising
maintaining a neighbor list for the base station serving the macrocell that does not include the common cell definition code.

10. The method of claim 1, wherein the plurality of microcells comprise in-building wireless service coverage areas.

11. A method of communicating, comprising:
using a common cell definition code for a plurality of microcells within a single macrocell to facilitate a handoff between the macrocell and at least one of the microcells, wherein the plurality of the microcells respectively correspond to a building;

determining if a mobile station currently communicating with a base station serving the macrocell detects the common cell definition code;

after determining that the mobile station detected the common cell definition code, using respective base stations of the plurality of microcells to locate a reverse pilot signal from the mobile station by tuning to an uplink frequency used by the macrocell and the mobile station;

detecting the reverse pilot signal at only one of the microcells;

identifying the only one of the microcells as the microcell to which the mobile station should be handed off;

using a first common cell definition code as an indicator that a mobile station is entering a building; and using a second common cell definition code as an indicator that a mobile station is exiting a building.

12. The method of claim 11, comprising
transmitting the common cell definition code near an interface between the microcell and the macrocell on the frequency used by the macrocell.

13. The method of claim 11, comprising
initiating a handoff from the macrocell to the only one of the microcells.

14. The method of claim 11, comprising
using a second common cell definition code to facilitate a handoff from at least one of the microcells to the macrocell.

15. The method of claim 11, wherein the microcell definition code comprises at least one of a pseudo random noise offset or a scrambling code.

16. The method of claim 11, comprising at least one of
maintaining a neighbor list having only one identifier of the macrocell at each of a plurality of base stations serving the plurality of microcells, respectively; or
maintaining a neighbor list at a base station serving the macrocell having the common cell definition code for each of the plurality of microcells within the macrocell as the only entry identifying the entire plurality of microcells.

17. The method of claim 11, wherein
the plurality of microcells is a first plurality;
there is at least one second plurality of microcells within the macrocell having a second, different common cell definition code;
and the method comprises
taking the power measurement at only the plurality of microcells corresponding to the common cell definition code detected by the mobile station.

18. The method of claim 11, comprising
maintaining a neighbor list for the base station serving the macrocell that does not include the common cell definition code.

* * * * *